(12) United States Patent
Ogo

(10) Patent No.: US 10,544,855 B2
(45) Date of Patent: Jan. 28, 2020

(54) CHAIN GUIDE

(71) Applicant: TSUBAKIMOTO CHAIN CO., Osaka-shi, Osaka (JP)

(72) Inventor: Toshitaka Ogo, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 231 days.

(21) Appl. No.: 15/621,161

(22) Filed: Jun. 13, 2017

(65) Prior Publication Data

US 2017/0370449 A1 Dec. 28, 2017

(30) Foreign Application Priority Data

Jun. 22, 2016 (JP) ................................. 2016-123216

(51) Int. Cl.
*F16H 7/18* (2006.01)
*F16H 7/08* (2006.01)

(52) U.S. Cl.
CPC .................. *F16H 7/18* (2013.01); *F16H 7/08* (2013.01); *F16H 2007/0872* (2013.01); *F16H 2007/0889* (2013.01); *F16H 2007/185* (2013.01)

(58) Field of Classification Search
CPC ................. F16H 7/18; F16H 2007/185; F16H 2007/0872; F16H 2007/0889
See application file for complete search history.

(56) References Cited

U.S. PATENT DOCUMENTS

| 2005/0049095 A1* | 3/2005 | Shum | F16H 7/08 474/140 |
|---|---|---|---|
| 2006/0199689 A1 | 9/2006 | Yoshimoto et al. | |
| 2009/0036242 A1 | 2/2009 | Hayami et al. | |
| 2014/0179473 A1* | 6/2014 | Konno | F16H 7/18 474/140 |
| 2014/0213401 A1* | 7/2014 | Konno | F16H 7/18 474/140 |
| 2014/0243132 A1* | 8/2014 | Kurematsu | F16H 7/18 474/140 |
| 2014/0248983 A1* | 9/2014 | Ishikawa | F16H 7/18 474/140 |
| 2016/0097439 A1 | 4/2016 | Geibel et al. | |
| 2016/0102737 A1 | 4/2016 | Geibel et al. | |

FOREIGN PATENT DOCUMENTS

| CN | 105485274 A | 4/2016 |
| DE | 102014014905 A1 | 4/2016 |
| JP | 2006-242357 A | 9/2006 |
| JP | 2009-36275 A | 2/2009 |

* cited by examiner

*Primary Examiner* — Michael R Mansen
*Assistant Examiner* — Robert T Reese
(74) *Attorney, Agent, or Firm* — Westerman, Hattori, Daniels & Adrian, LLP

(57) ABSTRACT

Provided is a chain guide that enables a reduction in size with a simple structure, without lowering the strength of the chain guide. The base member 30 includes a side wall rib 32 or 33 extending upward higher than a shoe support surface 31 at at least one of both side edges 31*a* and 31*b* in a guide width direction. The guide shoe 20 includes, at at least one of both side edges 20*a* and 20*b* in the guide width direction, an upstream lip 22, a downstream lip 23, and a shoe widthwise recess 24 formed between the upstream lip 22 and the downstream lip 23 by inwardly recessing the side edge 20*a* or 20*b* of the guide shoe 20 in the guide width direction. The side wall rib 32 or 33 is located inside the shoe widthwise recess 24.

4 Claims, 7 Drawing Sheets

CHAIN GUIDE

BACKGROUND OF THE INVENTION

1. Field of the Invention

The present invention relates to a chain guide that includes a guide shoe having a shoe surface that slidably guides a running chain, and a base member having a shoe support surface that supports this guide shoe.

2. Description of the Related Art

A chain guide has hitherto been known, which is incorporated in a timing system in the engine room of a car and slidably guides a chain running between sprockets to keep an appropriate chain tension (see, for example, Japanese Patent Application Laid-open No. 2006-242357).

This chain guide described in Japanese Patent Application Laid-open No. 2006-242357 is made up of a guide shoe that slidably guides the running chain, and a base member that supports the guide shoe, and configured such that the guide shoe is removably attached to the base member by means of a plurality of hooks formed to the guide shoe and engaged with engagement portions of the base member.

In such a chain guide, it is also known to restrict sideway displacement of the guide shoe relative to the base member to achieve stable movement of the chain in sliding contact with the guide shoe, and also to provide side wall ribs on the upper face of the base member such as to stand on the left and right side edges in the guide width direction, for the purpose of enhancing the strength of the base member by utilizing available space on the guide shoe side (see, for example, Japanese Patent Application Laid-open No. 2009-036275).

SUMMARY OF THE INVENTION

In the chain guide described in Japanese Patent Application Laid-open No. 2009-036275, however, while the strength of the base member can be enhanced without causing an increase in size of the chain guide in the guide height direction by providing side wall ribs on the base member to be located on the sides of the guide shoe, the overall dimension of the chain guide in the guide width direction is increased by the thickness of the side wall ribs. A further reduction in size of the chain guide, without compromising the strength of the chain guide, is sometimes necessary, such as when there is only a small installation space available for the chain guide inside the engine room.

Accordingly, an object of the present invention is to solve these problems and to provide a chain guide that enables a reduction in size with a simple structure, without lowering the strength of the chain guide.

The present invention achieves the above object by providing a chain guide including: a guide shoe having a shoe surface that slidably guides a running chain; and a base member having a shoe support surface that supports the guide shoe, the base member including a side wall rib extending upward higher than the shoe support surface at at least one of both side edges in a guide width direction of the base member, the guide shoe including, at at least one of both side edges in the guide width direction thereof, an upstream lip, a downstream lip spaced apart in a guide longitudinal direction from the upstream lip, and a shoe widthwise recess formed between the upstream lip and the downstream lip by inwardly recessing a side edge of the guide shoe in the guide width direction, and the side wall rib being located inside the shoe widthwise recess.

The terms "upstream" and "downstream" are used herein to distinguish one side and the other side in the guide longitudinal direction and do not mean an upstream side and a downstream side of a chain running direction. For instance, the upstream lip may be provided on a chain entrance side of the chain guide where the chain enters the chain guide, or, conversely, the upstream lip may be provided on an exit side of the chain guide.

According to one aspect of the present invention, there is formed a shoe widthwise recess between the upstream lip and the downstream lip of the guide shoe by inwardly recessing a side edge of the guide shoe in the guide width direction, and this shoe widthwise recess is used as the space for setting the side wall rib of the base member, so that, while the size of the base member is maintained to prevent a reduction in strength of the chain guide, an increase in size of the chain guide in the guide width direction by the thickness of the side wall rib of the base member is avoided, and thus the chain guide can be made smaller.

The shoe widthwise recess formed in a region between the upstream lip and the downstream lip prevents the chain guiding capability provided by the upstream lip and the downstream lip from being compromised at the chain entrance and exit of the chain guide where, for example, sideway displacement of the chain tends to occur, and also enables a reduction in material cost of the guide shoe.

According to another aspect of the present invention, the side wall rib protrudes upward higher than the shoe surface of the guide shoe, so that this side wall rib can serve the function of a guide portion that guides the chain in the region between the upstream lip and the downstream lip of the guide shoe. The running chain is guided by the upstream lip and the downstream lip of the guide shoe made of a material with good wear resistance and sliding properties at the chain entrance and exit of the chain guide where sideway displacement of the chain tends to occur, while, in the region between the upstream lip and the downstream lip where the chain runs relatively more stably, the chain is guided by the side wall rib of the base member, and thus the chain guiding capability is not compromised.

According to another aspect of the present invention, the base member includes a first side wall rib and a second side wall rib formed at a first guide side edge and a second guide side edge in the guide width direction of the base member, respectively; an upstream engagement portion formed upstream of the first side wall rib; and a downstream engagement portion formed downstream of the first side wall rib at the first guide side edge. The guide shoe includes an upstream hook to engage with the upstream engagement portion and a downstream hook to engage with the downstream engagement portion. The downstream engagement portion includes a restricting portion that restricts movement of the downstream hook toward the upstream side. The downstream hook is formed such as to be hooked to the downstream engagement portion from an outer side in the guide width direction by twisting and elastically deforming the guide shoe, with the upstream hook being engaged with the upstream engagement portion. Accordingly, the guide shoe can be attached to the base member with a simple operation. In addition, while the direction in which the downstream hook is attached to the downstream engagement portion is along the guide width direction, the direction in which movement of the downstream hook is restricted by the restricting portion of the downstream engagement portion is along the guide longitudinal direction. Therefore, good attachability and tightness of the downstream hook relative to the downstream engagement portion can both be readily achieved with a simple structure. Moreover, the shoe widthwise recess formed between the upstream lip and downstream lip by inwardly recessing the side edge of the guide shoe in the guide width direction makes it easier to twist the guide shoe, so that the attachability of the guide shoe relative to the base member can be improved further.

DESCRIPTION OF THE PREFERRED EMBODIMENTS

A chain guide 10 according to one embodiment of the present invention will be hereinafter described with reference to the drawings.

The chain guide 10 according to one embodiment of the present invention is incorporated in a timing system installed in an engine room when in use, and slidably guides a chain running between a plurality of sprockets to keep an appropriate chain tension. More specifically, the chain guide 10 guides the chain passing over the sprockets respectively provided to a crankshaft and cam shafts to stabilize the running chain, and keeps the tension of the chain appropriately by being pressed by a tensioner against the chain. While the chain guide 10 is configured as a pivot guide pivotally supported inside the engine room in this embodiment, the chain guide 10 may be configured as a fixed guide fixedly installed in the engine room.

Figure 1:
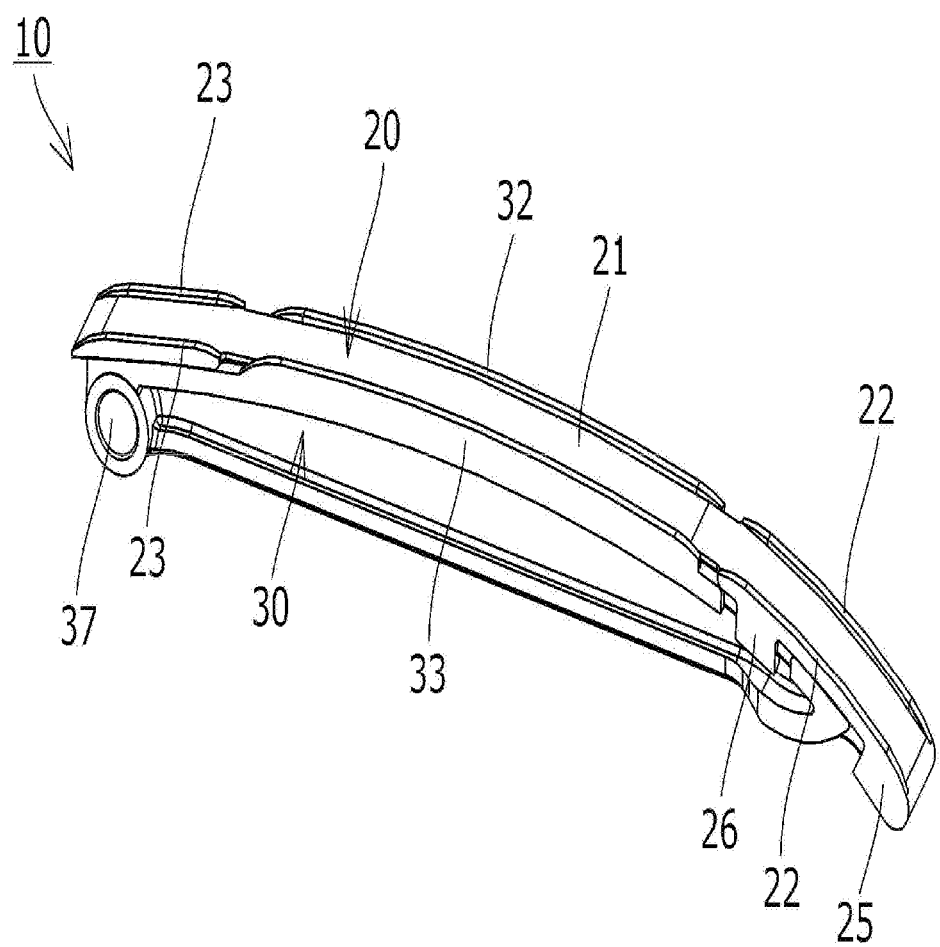
FIG. 1 is a perspective view illustrating a chain guide according to one embodiment of the present invention.
Figure 2:
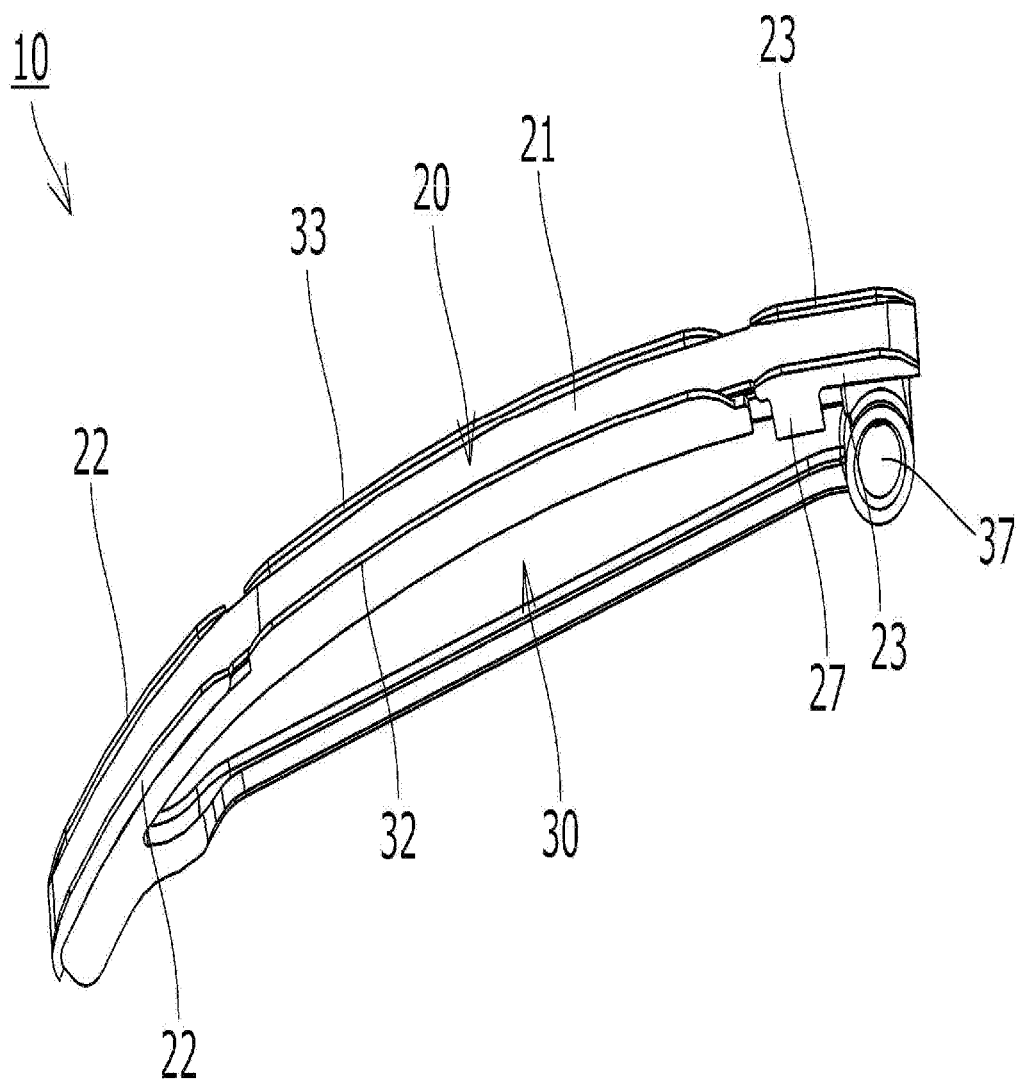
FIG. 2 is a perspective view illustrating the chain guide as seen from a different direction from that of FIG. 1.

The chain guide 10 includes, as shown in FIG. 1 and FIG. 2, a guide shoe 20 for slidably guiding the running chain along a guide longitudinal direction, and a base member 30 that is removably attached to the guide shoe 20 and supports the guide shoe 20.

Figure 3:
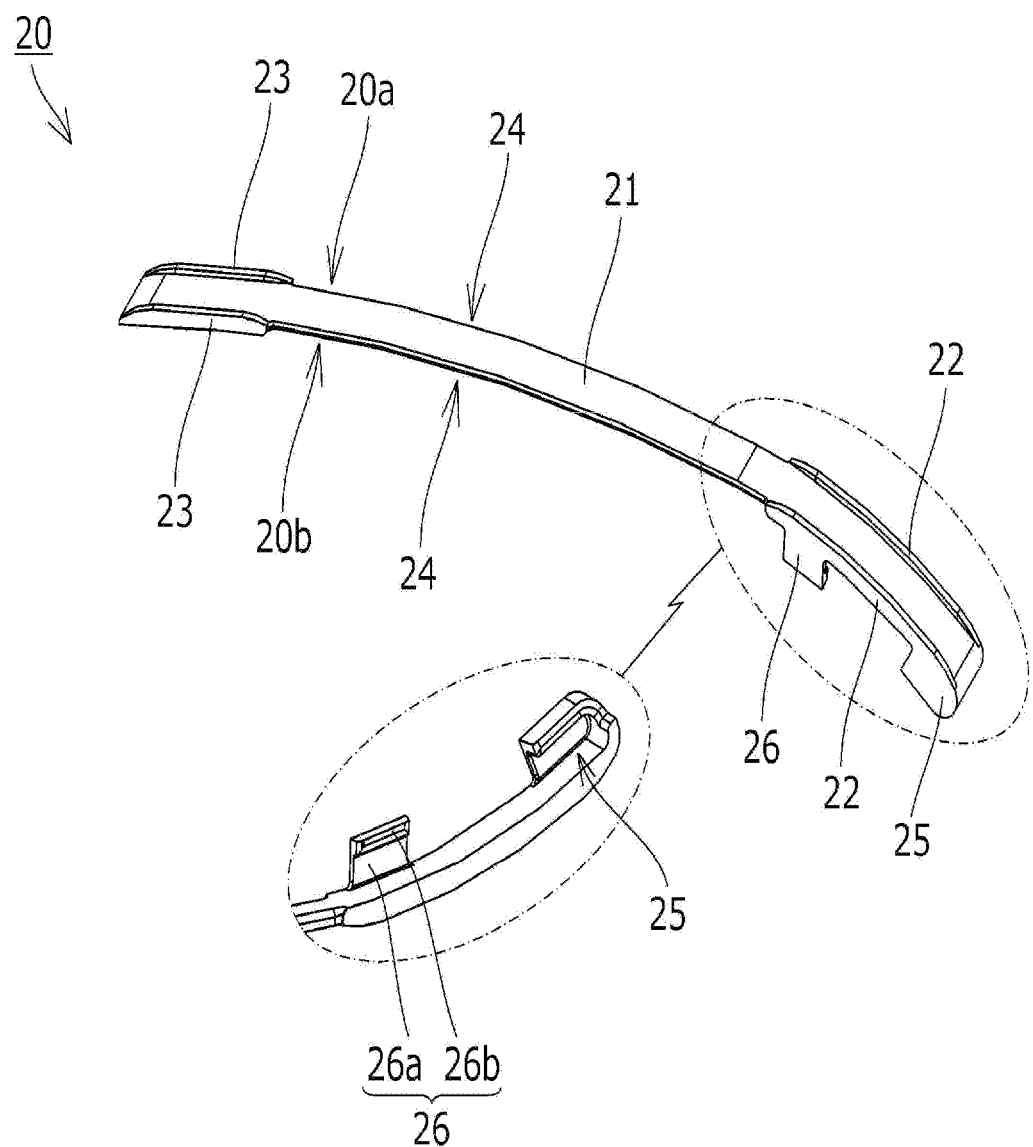
FIG. 3 is a perspective view illustrating a guide shoe.
Figure 4:
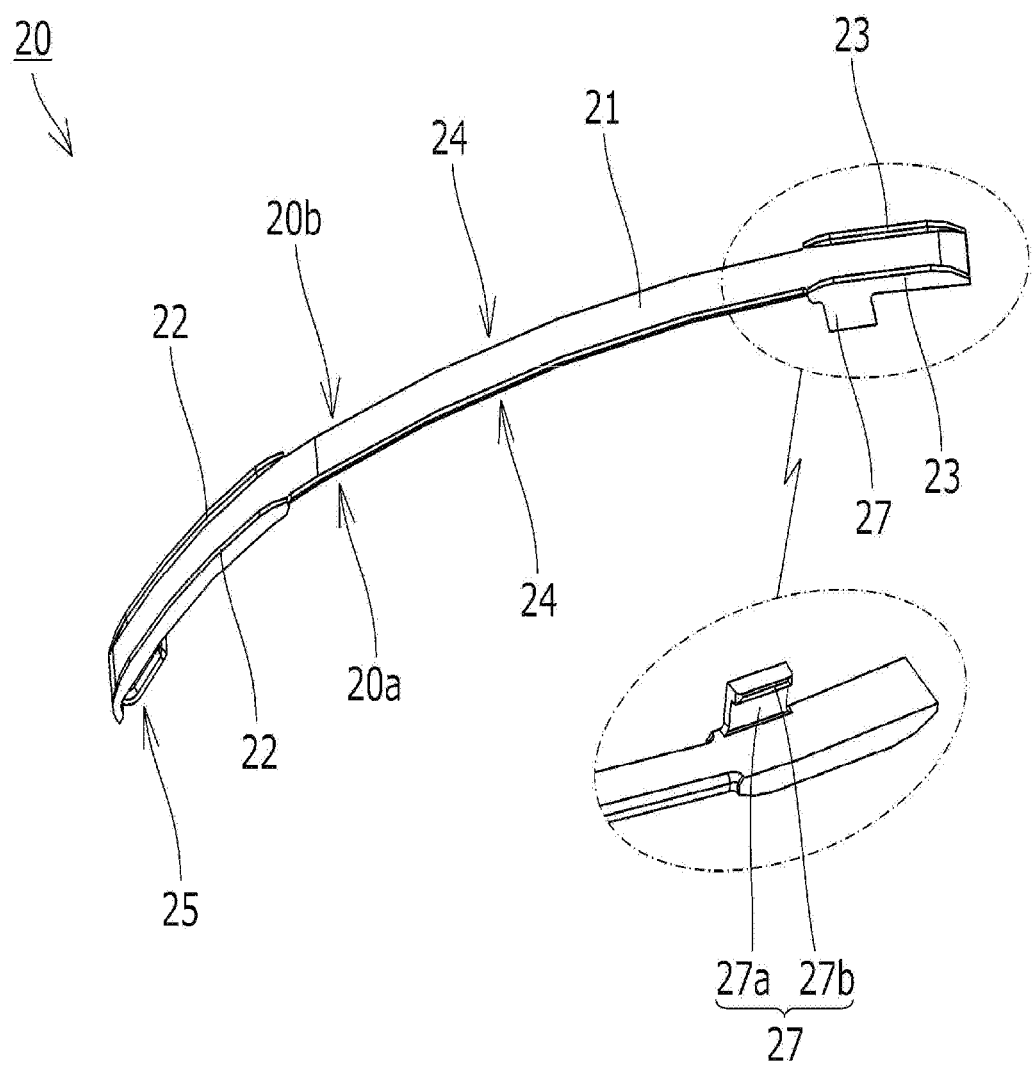
FIG. 4 is a perspective view illustrating the guide shoe as seen from a different direction from that of FIG. 3.

The guide shoe 20 has a shoe surface 21 that extends along the guide longitudinal direction for guiding the chain, as shown in FIG. 3 and FIG. 4, on the side facing the chain.

Along the right side edge (first guide side edge) 20a and left side edge (second guide side edge) 20b in the guide width direction on the upper face of the guide shoe 20, as shown in FIG. 3 and FIG. 4, there stand upstream lips 22 and downstream lips 23 spaced apart in the guide longitudinal direction from the upstream lips 22 downstream thereof.

Figure 7:
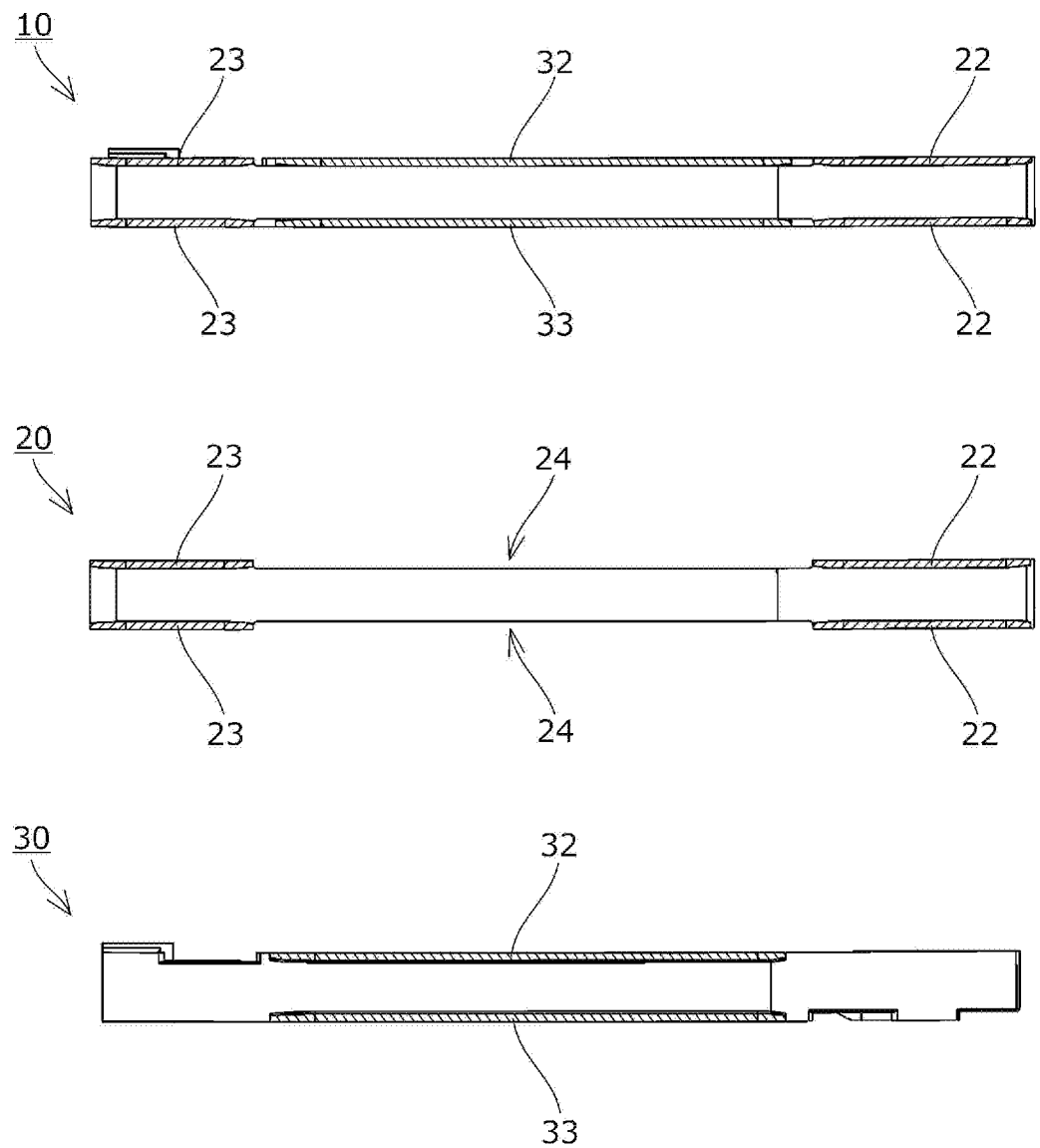
FIG. 7 is an illustrative diagram of the chain guide, guide shoe, and base member as seen from above.

The right side edge 20a and left side edge 20b of the guide shoe 20 include, as shown in FIG. 3, FIG. 4, and FIG. 7, shoe widthwise recesses 24 in the middle region between the upstream lips 22 and the downstream lips 23, which are formed by inwardly recessing the right side edge 20a and left side edge 20b of the guide shoe 20 in the guide width direction.

The guide shoe 20 includes, as shown in FIG. 3 and FIG. 4, a first upstream hook 25 to engage with a first upstream engagement portion 34 of the base member 30, a second upstream hook 26 to engage with a second upstream engagement portion 35 of the base member 30, and a downstream hook 27 to engage with a downstream engagement portion 36 of the base member 30.

The first upstream hook 25 is formed on the underside of the guide shoe 20 at the upstream end of the guide shoe 20 as shown in FIG. 3 and FIG. 4, and configured to be hooked to the first upstream engagement portion 34 from the upstream side so that the first upstream hook 25 is stopped from lifting up from the first upstream engagement portion 34.

The second upstream hook 26 is formed on the underside of the left side edge 20b of the guide shoe 20 downstream of the first upstream hook 25 and upstream of the shoe widthwise recesses 24 as shown in FIG. 3 and FIG. 4, and configured to be hooked to the second upstream engagement portion 35 from an outer side in the guide width direction so that the second upstream hook 26 is stopped from lifting up from the second upstream engagement portion 35.

The second upstream hook 26 has a base portion 26a extending downward from the underside of the guide shoe 20, and a hook portion 26b extending inward in the guide width direction from the lower end of the base portion 26a, as shown in FIG. 3.

The downstream hook 27 is formed on the underside of the right side edge 20a of the guide shoe 20 downstream of the shoe widthwise recesses 24 as shown in FIG. 3 and FIG. 4, and configured to be hooked to the downstream engagement portion 36 from an outer side in the guide width direction so that the downstream hook 27 is stopped from lifting up from the downstream engagement portion 36.

The downstream hook 27 has a base portion 27a extending downward from the underside of the guide shoe 20, and a hook portion 27b extending inward in the guide width direction from the lower end of the base portion 27a, as shown in FIG. 4.

Figure 5:
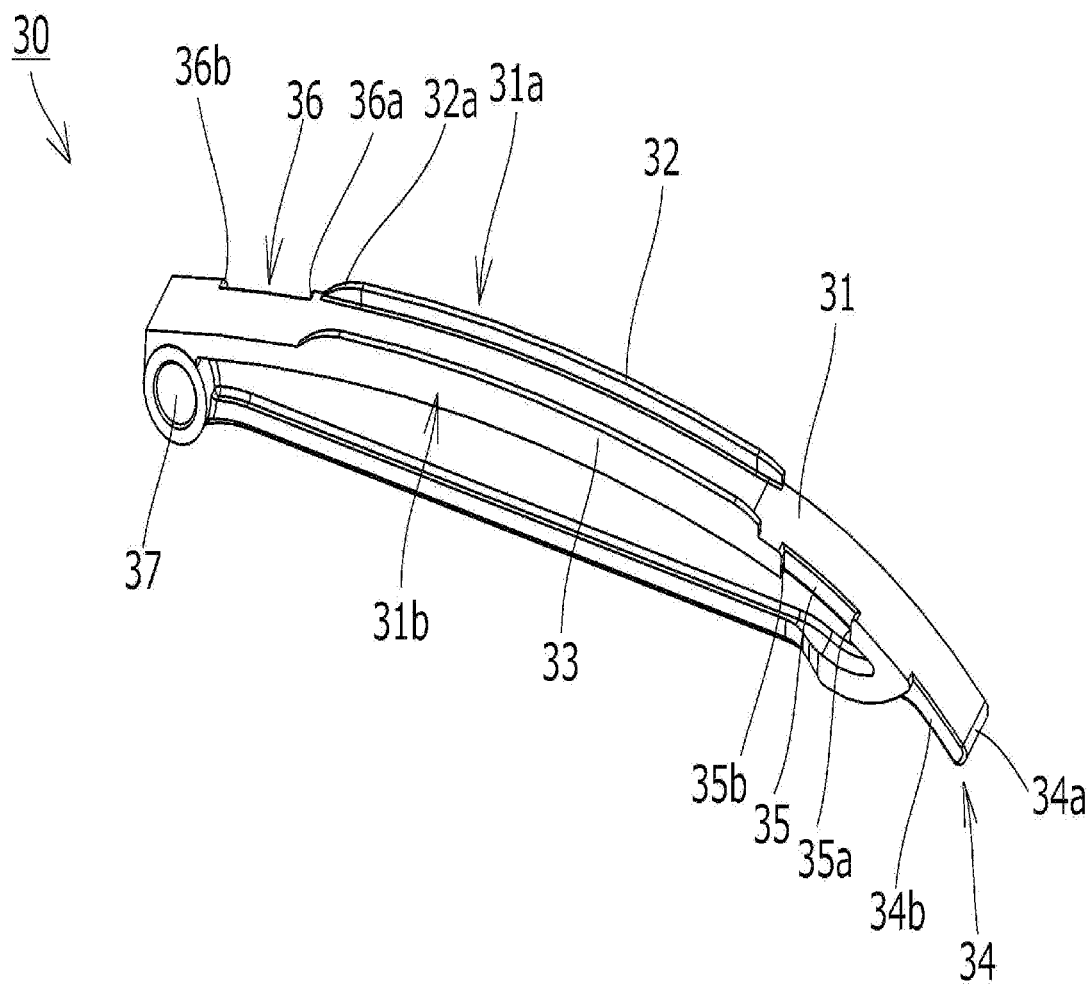
FIG. 5 is a perspective view illustrating a base member.
Figure 6:
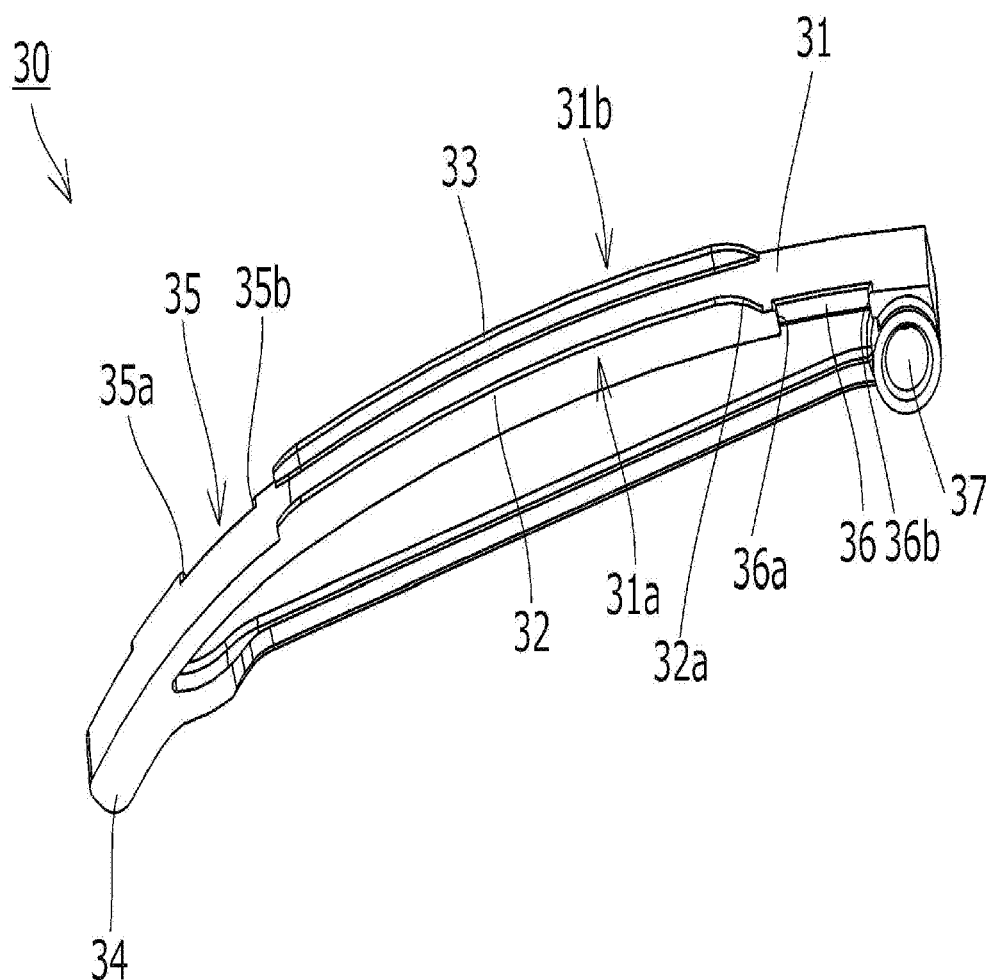
FIG. 6 is a perspective view illustrating the base member as seen from a different direction from that of FIG. 6.

The base member 30 includes, as shown in FIG. 5 and FIG. 6, a shoe support surface 31 curved along the guide longitudinal direction to support the guide shoe 20, a right side wall rib (first side wall rib) 32 standing at the right side edge 31a in the guide width direction of the shoe support surface 31, a left side wall rib (second side wall rib) 33 standing at the left side edge 31b in the guide width direction of the shoe support surface 31, the first upstream engagement portion 34 formed upstream of the right side wall rib 32, the second upstream engagement portion 35 formed downstream of the first upstream engagement portion 34 and upstream of the left side wall rib 33, the downstream engagement portion 36 formed downstream of the right side wall rib 32, and an attachment hole 37 formed at the downstream end for letting a bolt or the like protruding from an engine block to pass through.

The right side wall rib 32 is formed with a curved guide portion 32a at the downstream end thereof that is curved to smoothly connect to the shoe support surface 31 on the downstream side, as well as a curved portion at the upstream end thereof that is curved to smoothly connect to the shoe support surface 31 on the upstream side, as shown in FIG. 5 and FIG. 6.

Similarly, the left side wall rib 33 is formed with a curved portion at the downstream end thereof that is curved to smoothly connect to the shoe support surface 31 on the downstream side, as well as a curved portion at the upstream end thereof that is curved to smoothly connect to the shoe support surface 31 on the upstream side.

There are areas where no side wall ribs 32 and 33 are formed on the upstream and downstream sides of the left side edge 31b and right side edge 31a.

The right side wall rib 32 is located inside the shoe widthwise recess 24 formed at the right side edge 20a of the guide shoe 20 as viewed in the up and down direction as shown in FIG. 7, and protruded upward higher than the shoe surface 21 of the guide shoe 20 as shown in FIG. 1 and FIG. 2.

The right side wall rib 32 is located at the same position in the guide width direction as that of the upstream lip 22 and downstream lip 23 formed at the right side edge 20a of the guide shoe 20, so as to guide the chain together with the upstream lip 22 and downstream lip 23.

The left side wall rib 33 is located inside the shoe widthwise recess 24 formed at the left side edge 20b of the guide shoe 20 as viewed in the up and down direction as shown in FIG. 7, and protruded upward higher than the shoe surface 21 of the guide shoe 20 as shown in FIG. 1 and FIG. 2.

The left side wall rib 33 is located at the same position in the guide width direction as that of the upstream lip 22 and downstream lip 23 formed at the left side edge 20b of the guide shoe 20, so as to guide the chain together with the upstream lip 22 and downstream lip 23.

The first upstream engagement portion 34 is formed at the upstream end of the base member 30, as shown in FIG. 5 and FIG. 6. The first upstream engagement portion 34 includes a first restricting portion 34a that restricts movement of the first upstream hook 25 engaged therewith toward the downstream side, and a second restricting portion 34b that restricts movement of the first upstream hook 25 engaged therewith toward the right side edge 31a.

The second upstream engagement portion 35 is formed by inwardly recessing the left side edge 31b in the guide width direction as shown in FIG. 5 and FIG. 6.

The inner side face on the upstream side of the second upstream engagement portion 35 functions as a first restricting portion 35a that restricts movement of the second upstream hook 26 engaged therewith toward the upstream side, and the inner side face on the downstream side of the second upstream engagement portion 35 functions as a second restricting portion 35b that restricts movement of the second upstream hook 26 engaged therewith toward the downstream side.

The downstream engagement portion 36 is formed by inwardly recessing the right side edge 31a in the guide width direction as shown in FIG. 5 and FIG. 6.

The inner side face on the upstream side of the downstream engagement portion 36 functions as a first restricting portion 36a that restricts movement of the downstream hook 27 engaged therewith toward the upstream side, and the inner side face on the downstream side of the downstream engagement portion 36 functions as a second restricting portion 36b that restricts movement of the downstream hook 27 toward the downstream side.

How the guide shoe 20 is attached to the base member 30 will now be explained below.

When attaching the guide shoe 20 to the base member 30, first, the first upstream hook 25 of the guide shoe 20 is hooked to the first upstream engagement portion 34 of the base member 30 from the upstream side (more specifically, from upstream in a direction from the left side edge 31b toward the right side edge 31a). In this state where the first upstream hook 25 is engaged with the first upstream engagement portion 34, the guide shoe 20 rests on the right side wall rib 32.

As the first upstream hook 25 is hooked to the first upstream engagement portion 34, the second upstream hook 26 is hooked to the second upstream engagement portion 35 from the outer side in the guide width direction, substantially at the same time.

Next, with the guide shoe 20 resting on the right side wall rib 32, the guide shoe 20 is slightly twisted and elastically deformed, so that the downstream hook 27 is hooked to the downstream engagement portion 36 from the outer side in the guide width direction.

At this time, the guide shoe 20 that was resting on the right side wall rib 32 is guided onto the shoe support surface 31 by the curved guide portion 32a formed at the downstream end of the right side wall rib 32, when the guide shoe 20 is twisted and thereby elastically deformed so that the downstream hook 27 is hooked to the downstream engagement portion 36.

The downstream end of the right side wall rib 32 should preferably be formed at a position 0.2 L to 0.6 L from the downstream end of the base member 30 (right side edge 31a) toward the upstream side, where L is the entire length of the base member 30 along the guide longitudinal direction. This way, a certain length of the right side wall rib 32 in the guide longitudinal direction is secured to increase the strength of the base member 30, as well as good attachability/removability of the downstream hook 27 relative to the downstream engagement portion 36 is achieved, since there is an area where the right side wall rib 32 is not formed on the downstream side of the right side edge 31a of the base member 30 so that interference between the downstream end of the right side wall rib 32 and the guide shoe 20 is avoided.

While one embodiment of the present invention has been described in detail, the present invention is not limited to the above-described embodiment and may be carried out with various design changes without departing from the scope of the present invention set forth in the claims.

For example, the material of the guide shoe may be selected from known suitable materials in accordance with various conditions such as elasticity, friction resistance, rigidity, durability, formability, cost, and so on. Synthetic resin materials are particularly suitable.

The material of the base member may be selected from metal materials or synthetic resin materials as appropriate in accordance with various conditions such as rigidity, durability, formability, cost, and so on.

In the embodiment described above, the side wall ribs are provided at both side edges (right side edge and left side edge) in the guide width direction of the base member. Alternatively, the side wall rib may be provided at only one of both side edges in the guide width direction of the base member. In this case, the shoe widthwise recess, where the side wall rib will be located, may be provided to only one of both side edges in the guide width direction of the guide shoe (more specifically, at the side edge on the side where the side wall rib is formed).

In the embodiment described above, the side wall ribs are protruded upward higher than the shoe surface. The height of the side wall ribs is not limited to this, and the side wall ribs may be formed to such a height that they do not protrude upward higher than the shoe surface.

In the embodiment described above, the first side wall rib and second side wall rib are formed to have the same size and to be located at the same position in the guide longitudinal direction. Instead, the size and position in the guide longitudinal direction of the first side wall rib and second side wall rib may be differed from each other.

In the embodiment described above, one each downstream hook and downstream engagement portion are formed, but the number of the downstream hook and downstream engagement portion may be two or more.

In the embodiment described above, a first side edge and a second side edge were described as the right side edge and the left side edge, respectively, and a first side wall rib and a second side wall rib were described as the right side wall rib and the left side wall rib, respectively. Instead, the first side edge and the second side edge may be designed as the left side edge and the right side edge, respectively, and the first side wall rib and the second side wall rib may be designed as the left side wall rib and the right side wall rib, respectively.

What is claimed is:

1. A chain guide comprising:
    a guide shoe having a shoe surface that slidably guides a running chain; and
    a base member having a shoe support surface that supports the guide shoe,
    the base member including a side wall rib extending upward higher than the shoe support surface on at least one of both side edges in a guide width direction of the base member,
    the guide shoe including, on at least one of both side edges in the guide width direction thereof, upstream lips, downstream lips spaced apart in a guide longitudinal lengthwise direction from the upstream lips, and a shoe widthwise recess formed between the upstream lips and the downstream lips by inwardly recessing a side edge of the guide shoe in the guide width direction, and
    the side wall rib being located inside the shoe widthwise recess.

2. The chain guide according to claim 1, wherein the side wall rib is formed at each of both side edges in the guide width direction of the base member, and
    the upstream lips, the downstream lips, and the shoe widthwise recess are provided at each of both side edges in the guide width direction of the guide shoe.

3. The chain guide according to claim 1, wherein the side wall rib protrudes upward higher than the shoe surface.

4. The chain guide according to claim 1, wherein the side wall rib includes a first side wall rib and a second side wall rib formed at a first guide side edge and a second guide side edge in the guide width direction of the base member, respectively,
    the base member includes an upstream engagement portion formed on one side in the guide longitudinal lengthwise direction of the first side wall rib, and a downstream engagement portion formed on the first guide side edge on the other side in the guide longitudinal lengthwise direction of the first side wall rib,
    the guide shoe includes an upstream hook to engage with the upstream engagement portion and a downstream hook to engage with the downstream engagement portion,
    the downstream engagement portion includes a restricting portion that restricts movement of the downstream hook toward an upstream side, and
    the downstream hook is formed such as to be hooked to the downstream engagement portion from an outer side in the guide width direction by twisting and elastically deforming the guide shoe, with the upstream hook being engaged with the upstream engagement portion.

* * * * *